United States Patent
Wu et al.

(10) Patent No.: US 10,558,327 B2
(45) Date of Patent: Feb. 11, 2020

(54) METHODS AND DEVICES FOR UPDATING INPUT METHOD SYSTEMS

(71) Applicant: Baidu Online Network Technology (Beijing) Co., Ltd., Beijing (CN)

(72) Inventors: Xianchao Wu, Beijing (CN); Chuang Wu, Beijing (CN); Xiaoxin Chen, Beijing (CN); Long Chen, Beijing (CN); Mianmian Wen, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 354 days.

(21) Appl. No.: 14/904,667

(22) PCT Filed: Jun. 6, 2014

(86) PCT No.: PCT/CN2014/079369
§ 371 (c)(1),
(2) Date: Apr. 5, 2016

(87) PCT Pub. No.: WO2015/014158
PCT Pub. Date: Feb. 5, 2015

(65) Prior Publication Data
US 2016/0370959 A1  Dec. 22, 2016

(30) Foreign Application Priority Data
Jul. 29, 2013  (CN) .......................... 2013 1 0322415

(51) Int. Cl.
*G06F 3/0482* (2013.01)
*G06F 3/023* (2006.01)
(Continued)

(52) U.S. Cl.
CPC .............. *G06F 3/0482* (2013.01); *G06F 8/65* (2013.01); *G06F 9/445* (2013.01)

(58) Field of Classification Search
CPC ....... G06F 3/0482; G06F 3/0237; G06F 9/445
See application file for complete search history.

(56) References Cited

U.S. PATENT DOCUMENTS 9,471,566 B1 * 10/2016 Zhang ................. G06F 17/2863
2008/0235003 A1 * 9/2008 Lai .......................... G06F 3/018
704/8
(Continued)

FOREIGN PATENT DOCUMENTS

CN      1912872 A      2/2007
CN      103399766 A    11/2013
(Continued)

OTHER PUBLICATIONS

PCT/CN2014/079369, International Search Report, dated Aug. 11, 2014, 2 pages.

*Primary Examiner* — Li P Sun
(74) *Attorney, Agent, or Firm* — Lathrop GPM LLP

(57) ABSTRACT

Provided are a method and device for updating an input method system, a computer storage medium, and a device. The method includes: receiving multiple operation logs from multiple user terminals on which the input method system is installed, the operation logs recording log entries which indicate an operations of input corresponding candidate items; extracting log entries from the received operation logs; determining a quantity of log entries of each type; and sending, according to the determined quantity, log entries in a preset type to the user terminals on which the input method system is installed, so as to update the input method system.

13 Claims, 6 Drawing Sheets

(51) Int. Cl.
*G06F 9/445* (2018.01)
*G06F 8/65* (2018.01)
*G06F 17/27* (2006.01)

(56) References Cited

U.S. PATENT DOCUMENTS

2008/0243834 A1    10/2008  Rieman et al.
2009/0073488 A1*    3/2009  Nakatomi ............. G06F 3/0237
                                                          358/1.15

FOREIGN PATENT DOCUMENTS

| CN | 102073527 A | 2/2015 |
| JP | 2005-258888 A | 9/2005 |
| JP | 2005-275446 A | 10/2005 |
| JP | 2010-256498 A | 11/2010 |
| JP | 2011-253480 A | 12/2011 |

* cited by examiner

1000

1100

1200

METHODS AND DEVICES FOR UPDATING INPUT METHOD SYSTEMS

RELATED APPLICATIONS

This application is a national-phase application claiming the priority of PCT application No. PCT/CN2014/079369, filed Jun. 6, 2014, which claims the priority to Chinese Patent Application No. 201310322415.6, filed on Jul. 29, 2013, and entitled "Method and Device for Updating Input Method System." The disclosure of the above applications is incorporated herein by reference in its entirety.

TECHNICAL FIELD

The present invention relates to the field of input methods, and in particular, to a technology for updating an input method system.

RELATED ART

With the development of information technologies, input methods are playing an increasingly important role in people's life. An input method refers to an encoding method used to enter various symbols to electronic devices (such as a computer, a mobile phone, and a tablet computer). When a user enters a piece of input by using an input device such as a keyboard, candidates corresponding to the input are displayed, so that the user can select a needed candidate. For example, when the user enters a piece of input using Pinyin, multiple Chinese characters or phrases corresponding to the Pinyin input are displayed.

An association between the input and the candidates is obtained by means of a large amount of corpus training, and is stored in a word stock. When being displayed, candidates are arranged in a particular order according to related settings.

Generally, an input method provider captures new words and phrases from web pages and pushes a new word stock to users, to update an installed input method system. In other words, candidates associated with input and sorting of the candidates are updated. However, the update provided by the input method provider cannot truly reflect actual requirements of users. Therefore, it is necessary to provide a new technology for updating an input method system, to resolve the foregoing problem.

SUMMARY

An objective of the present invention is to provide a method and device for updating an input method system.

One aspect of the present invention provides a method of updating an input method system on a server, including: receiving multiple operation logs from multiple user terminals on which the input method system is installed, where the operation logs record log entries that each indicate an operation on a candidate corresponding to an input; extracting the log entries from the received multiple operation logs; determining the quantity of log entries of each type; and sending, according to the determined quantities, a log entry of a predetermined type to the user terminals on which the input method system is installed, so as to update the input method system.

Optionally, the step of sending, according to the determined quantities, a log entry of a predetermined type to the user terminals on which the input method system is installed includes: when the quantity of log entries of one type is greater than a predetermined threshold, or a ratio of the quantity of log entries of one type to the quantity of the user terminals on which the input method system is installed is greater than a predetermined threshold, sending the log entries of this type to the user terminals on which the input method system is installed.

Optionally, each log entry indicates one operation on a candidate corresponding to one input.

Optionally, the operation on the candidate corresponding to the input includes at least one of deletion, addition, modification, and reordering.

Optionally, the user terminals perform, on a candidate that is in the input method system and that corresponds to an input, an operation indicated by the log entry of the type, so as to update the input method system.

Another aspect of the present invention provides a method of updating an input method system on a client, including: receiving update information from a server, where the update information indicates an operation on a candidate corresponding to an input; analyzing the received update information, to determine the operation indicated by the update information; and performing, on the candidate that is in the input method system and that corresponds to the input, the operation indicated by the update information.

Optionally, each piece of update information indicates one operation on a candidate corresponding to one input.

Optionally, the operation on the candidate corresponding to the input includes at least one of deletion, addition, modification, and reordering.

Optionally, the method further includes: receiving an input of a user; determining candidates corresponding to the input of the user; displaying the candidates corresponding to the input of the user; receiving an operation performed by the user on a candidate; recording the operation as a log entry in an operation log; and sending the operation log to the server.

Optionally, the update information is a log entry of a predetermined type among log entries in operation logs that are received by the server from user terminals on which the input method system is installed, where the quantity of the log entries of the predetermined type is greater than a predetermined threshold, or a ratio of the quantity of the log entries of the predetermined type to the quantity of the user terminals on which the input method system is installed is greater than a predetermined threshold.

Another aspect of the present invention provides a device for updating an input method system on a server, including: a receiving unit, configured to receive multiple operation logs from multiple user terminals on which the input method system is installed, where the operation logs record log entries that each indicate an operation on a candidate corresponding to an input; a log extraction unit, configured to extract the log entries from the received multiple operation logs; a counting unit, configured to determine the quantity of log entries of each type; and a sending unit, configured to send, according to the determined quantities, a log entry of a predetermined type to the user terminals on which the input method system is installed, so as to update the input method system.

Optionally, when the quantity of log entries of one type is greater than a predetermined threshold, or a ratio of the quantity of log entries of one type to the quantity of the user terminals on which the input method system is installed is greater than a predetermined threshold, the sending unit sends the log entries of this type to the user terminals on which the input method system is installed.

Optionally, each log entry indicates one operation on a candidate corresponding to one input.

Optionally, the operation on the candidate corresponding to the input includes at least one of deletion, addition, modification, and reordering.

Optionally, the user terminals perform, on a candidate that is in the input method system and that corresponds to an input, an operation indicated by the log entry of the type, so as to update the input method system.

Another aspect of the present invention provides a device for updating an input method system on a client, including: a receiving unit, configured to receive update information from a server, where the update information indicates an operation on a candidate corresponding to an input; an analysis unit, configured to analyze the received update information, to determine the operation indicated by the update information; and an updating unit, configured to perform, on the candidate that is in the input method system and that corresponds to the input, the operation indicated by the update information.

Optionally, each piece of update information indicates one operation on a candidate corresponding to one input.

Optionally, the operation on the candidate corresponding to the input includes at least one of deletion, addition, modification, and reordering.

Optionally, the device further includes: a first interface unit, configured to receive an input of a user; a conversion unit, configured to determine candidates corresponding to the input of the user; a display unit, configured to display the candidates corresponding to the input of the user; a second interface unit, configured to receive an operation performed by the user on a candidate; a storage unit, configured to record the operation as a log entry in an operation log; and a sending unit, configured to send the operation log to the server.

Optionally, the update information is a log entry of a predetermined type among log entries in operation logs that are received by the server from user terminals on which the input method system is installed, where the quantity of the log entries of the predetermined type is greater than a predetermined threshold, or a ratio of the quantity of the log entries of the predetermined type to the quantity of the user terminals on which the input method system is installed is greater than a predetermined threshold.

The method and device for updating an input method system according to the embodiments of the present invention can accurately detect an actual requirement of a user on the input method system, and update the input method system. In this way, the updated input method system can better reflect the actual requirement of the user on the input method system.

In addition, the method and device for updating an input method system according to the embodiments of the present invention allow a user to adjust candidates displayed in the input method system, thereby updating the input method system, so that the input method system can be updated according to a personalized requirement.

Additional aspects and/or advantages of the present invention will be set forth in part in the description which follows, and in part will be apparent from the description, or may be learned by practice of the present invention.

BRIEF DESCRIPTION OF THE DRAWINGS

The foregoing and other objectives, features, and advantages of the present invention will become more apparent from the following detailed descriptions with reference to the accompanying drawings, where.

DETAILED DESCRIPTION

The embodiments of the present invention are described in detail below with reference to the accompanying drawings.

Figure 1:
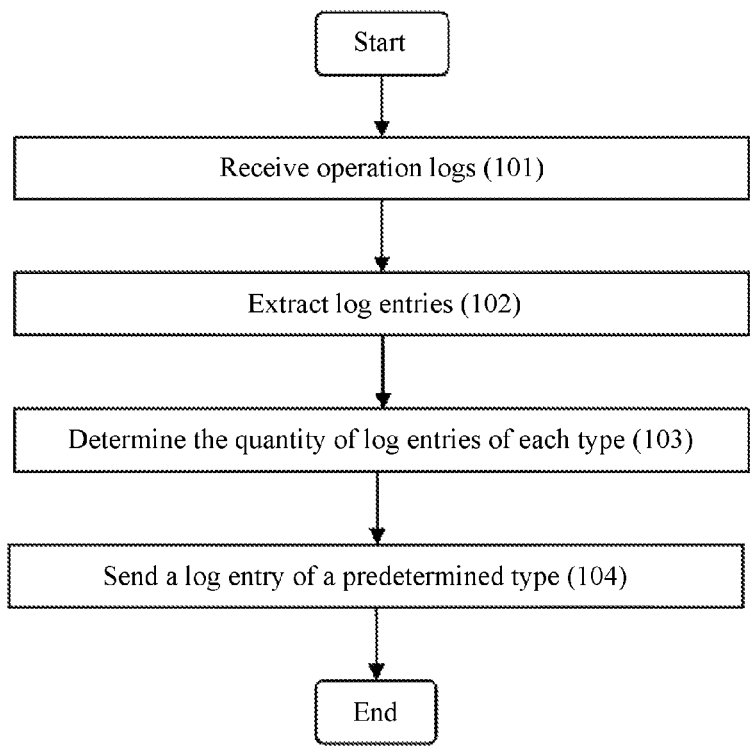
FIG. 1 is a flowchart of a method of updating an input method system on a server according to an embodiment of the present invention.

FIG. 1 is a flowchart of a method of updating an input method system on a server according to an embodiment of the present invention.

In step 101, operation logs are separately received from multiple user terminals on which the input method system is installed. The operation logs record log entries that each indicate an operation on a candidate corresponding to an input. Each log entry indicates one operation on one candidate corresponding to one input.

When a user enters a piece of input by using an input device such as a keyboard, a mouse, or a touch screen, candidates corresponding to the input are displayed. For example, when the user enters a piece of input using Pinyin, multiple Chinese characters or phrases corresponding to the Pinyin input are displayed as candidates. An operation performed by the user on a candidate may be recorded in an operation log.

The operation on the candidate may be of at least one of the following types: deletion, addition, modification, and reordering. Each time the user performs an operation on a candidate, the operation may be recorded as a log entry in the operation log.

In step 102, the log entries are extracted from the received multiple operation logs.

When operation logs are received from different user terminals, log entries may be extracted from the operation logs.

In step 103, the quantity of log entries of each type is determined. Herein, log entries formed by same operations (that is, operations having a same operation type and same specific operation content) on a candidate corresponding to a same input belong to a same type. For example, log entries that indicate an operation of deleting a particular candidate corresponding to a particular input belong to a same type; log entries that indicate a same modification on a particular candidate corresponding to a particular input belong to a same type; log entries that indicate a same reordering operation on a particular candidate corresponding to a particular input belong to a same type; and log entries that indicate an operation of adding a same candidate for a particular input belong to a same type.

In step 104, a log entry of a predetermined type is sent, according to the determined quantities, to the user terminals on which the input method system is installed, so as to update the input method system.

Specifically, when the quantity of log entries of one type is greater than a predetermined threshold, or a ratio of the quantity of log entries of one type to the quantity of the user terminals on which the input method system is installed is greater than a predetermined threshold, the log entry of this type is sent to the user terminals on which the input method system is installed.

For example, if the quantity of log entries that indicate an operation of deleting a particular candidate corresponding to a particular input is greater than the predetermined threshold, the log entry is sent to the user terminals, so that the user terminals may perform, in a word stock of the input method system according to the log entry, the operation of deleting the particular candidate corresponding to the particular input, so as to update the input method system.

Figure 2:
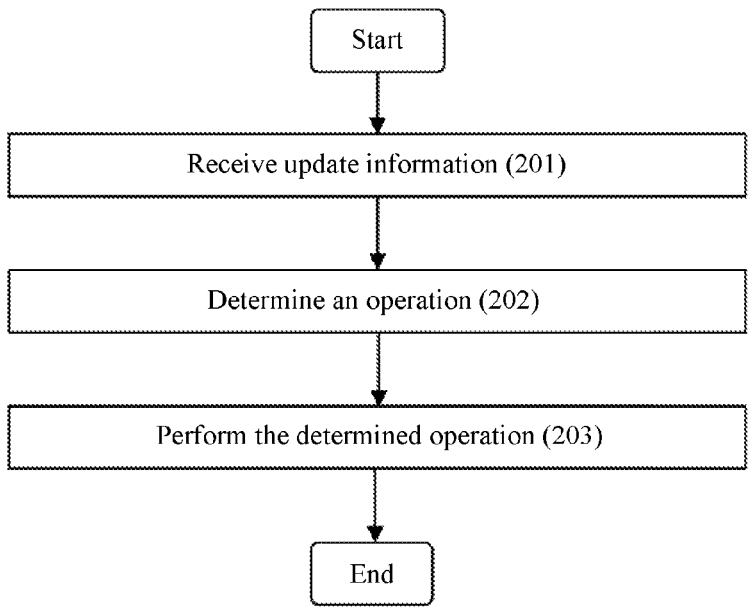
FIG. 2 is a flowchart of a method of updating an input method system on a user terminal according to an embodiment of the present invention.

FIG. 2 is a flowchart of a method of updating an input method system on a user terminal according to an embodiment of the present invention.

As shown in FIG. 2, in step 201, update information is received from a server. The update information indicates an operation on a candidate corresponding to an input. For example, the update information herein may be the log entry of the predetermined type sent by the server in the method shown in FIG. 1.

In step 202, the received update information is analyzed, to determine the operation indicated by the update information.

For example, when the log entry serving as the update information indicates an operation of deleting a particular candidate corresponding to a particular input, it may be determined that the operation indicated by the update information is the operation of deleting the particular candidate corresponding to the particular input.

In step 203, the operation indicated by the update information is performed on a candidate that is in a word stock of the input method system and that corresponds to an input, so as to update the input method system.

For example, if the operation indicated by the update information is an operation of deleting a particular candidate corresponding to a particular input, the operation of deleting the particular candidate corresponding to the particular input is performed in the word stock of the input method system, so as to update the input method system. In this way, next time the user enters the particular input, the particular candidate is no longer displayed among corresponding candidates.

Figure 3:
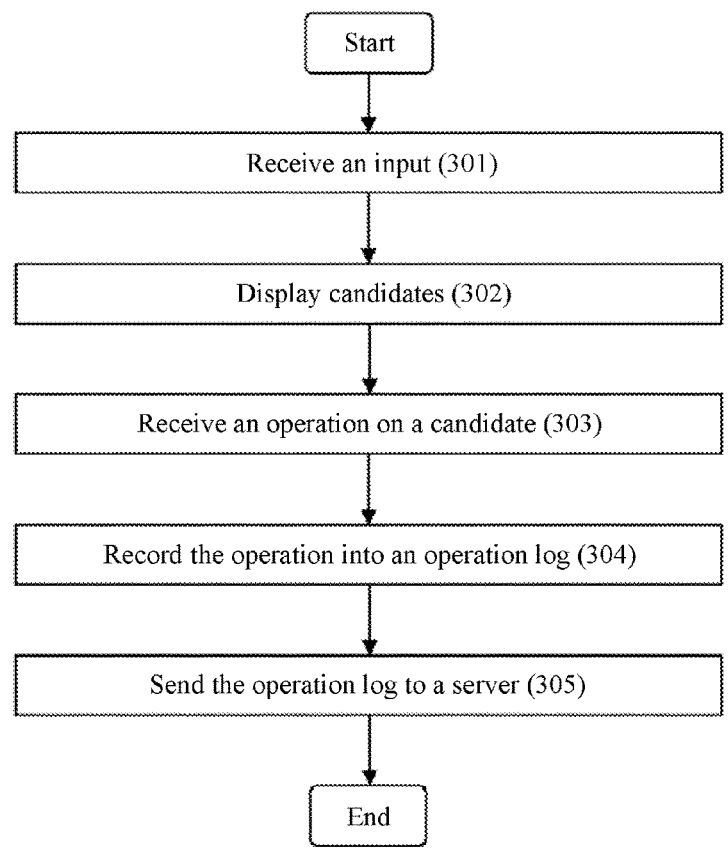
FIG. 3 is a flowchart of a method of updating an input method system on a user terminal according to another embodiment of the present invention.

FIG. 3 is a flowchart of a method of updating an input method system on a user terminal according to another embodiment of the present invention.

In step 301, an input of a user is received. The input of the user refers to an input that is entered to the input method system for input conversion, for example, a group of phonetic alphabets that represent a Chinese pronunciation. The input of the user may be received by using an input device such as a keyboard, a mouse, and a touch screen.

In step 302, candidates corresponding to the input of the user are determined and displayed. Candidates corresponding to the input of the user may be determined by using a conventional technology, so that when the input of the user is received, the corresponding candidates are displayed.

Figure 4:
FIG. 4 shows an example of displaying corresponding candidates when receiving an input of a user according to an embodiment of the present invention.

FIG. 4 shows an example of displaying corresponding candidates when receiving an input of a user according to an embodiment of the present invention.

FIG. 4 shows an example in which Japanese is input. When a user enters "あした" by using a keyboard displayed on a touch screen, candidates such as "明日" and "足山" are displayed.

In step 303, an operation performed by the user on a candidate is received. The operation on the candidate may be of the following type: deletion, addition, modification, reordering, or the like.

Figure 5:
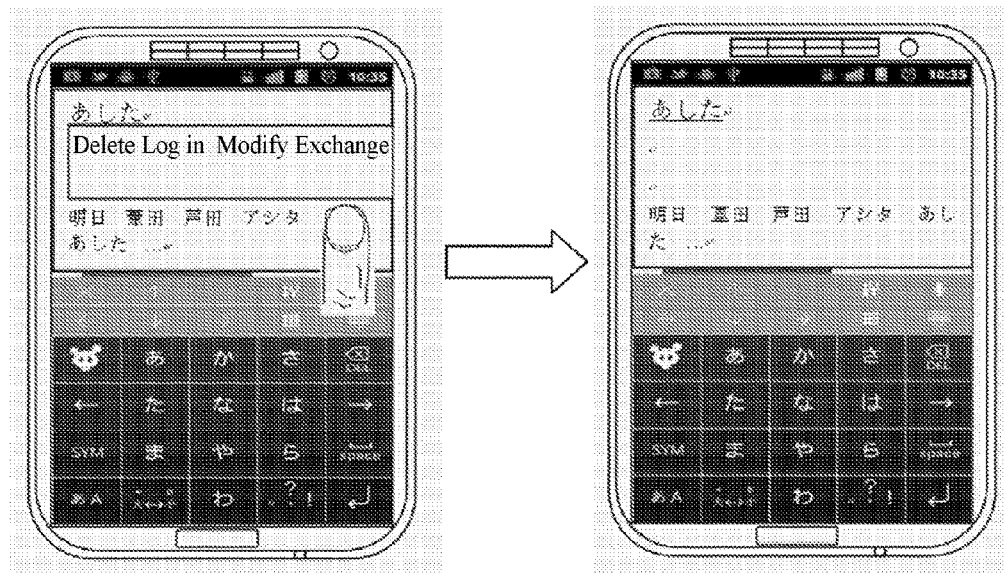
FIG. 5 shows an example of an operation of deleting a candidate according to an embodiment of the present invention.

FIG. 5 shows an example of an operation of deleting a candidate according to an embodiment of the present invention.

As shown in FIG. 5, when a user presses a displayed particular candidate (for example, "足山") for a predetermined time (for example, two seconds), a menu used for performing operations on candidates is displayed on the screen. As shown in FIG. 5, the menu may include the following items: delete, log in, modify, and move.

When the user further taps the item "delete", the candidate (for example, "足山") that is previously pressed by the user is deleted.

Figure 6:
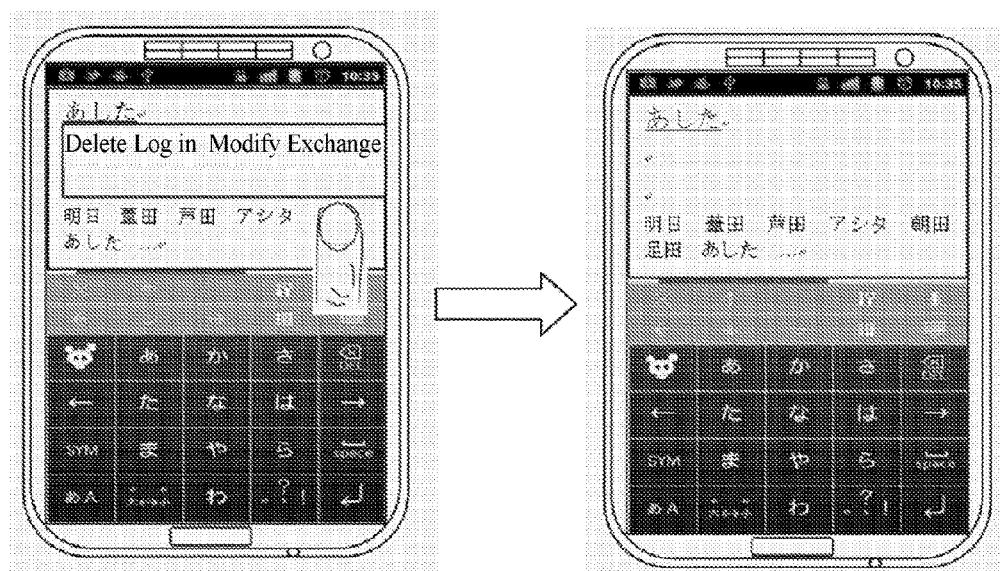
FIG. 6 shows an example of an operation of adding a candidate according to an embodiment of the present invention.

FIG. 6 shows an example of an operation of adding a candidate according to an embodiment of the present invention.

As shown in FIG. 6, when a user presses a displayed particular candidate (for example, "足田") for a predetermined time (for example, two seconds), a menu used for performing operations on candidates is displayed on the screen. As shown in FIG. 6, the menu may include the following items: delete, log in, modify, and move.

When the user further taps the item "log in", a related interface (for example, an input box) may be displayed, for the user to add a new candidate (for example, "朝田"). The new candidate may be added by means of pasting or direct entering. Optionally, the added candidate may be located in front of or following the candidate (for example, "足口") that is previously pressed by the user.

Figure 7:
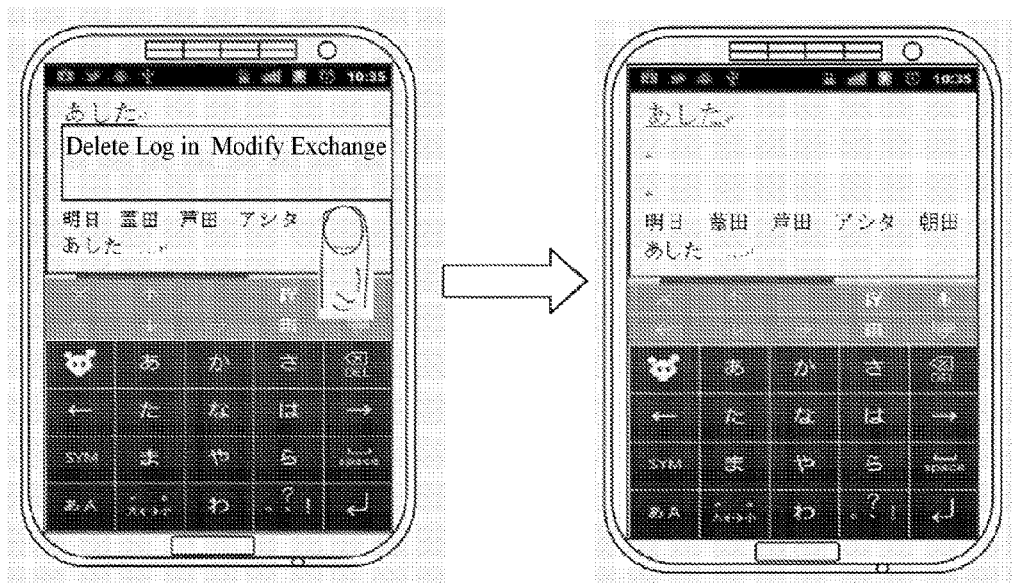
FIG. 7 shows an example of an operation of modifying a candidate according to an embodiment of the present invention.

FIG. 7 shows an example of an operation of modifying a candidate according to an embodiment of the present invention.

As shown in FIG. 7, when a user presses a displayed particular candidate (for example, "足田") for a predetermined time (for example, two seconds), a menu used for performing operations on candidates is displayed on the screen. As shown in FIG. 7, the menu may include the following items: delete, log in, modify, and move.

When the user further taps the item "modify", a related interface may be displayed, for the user to modify the candidate (for example, "足田") that is previously pressed by the user (for example, modify the candidate to be "朝田"). In this way, after the modification, a candidate (for example, "朝山") that is obtained after the modification is displayed.

Figure 8:
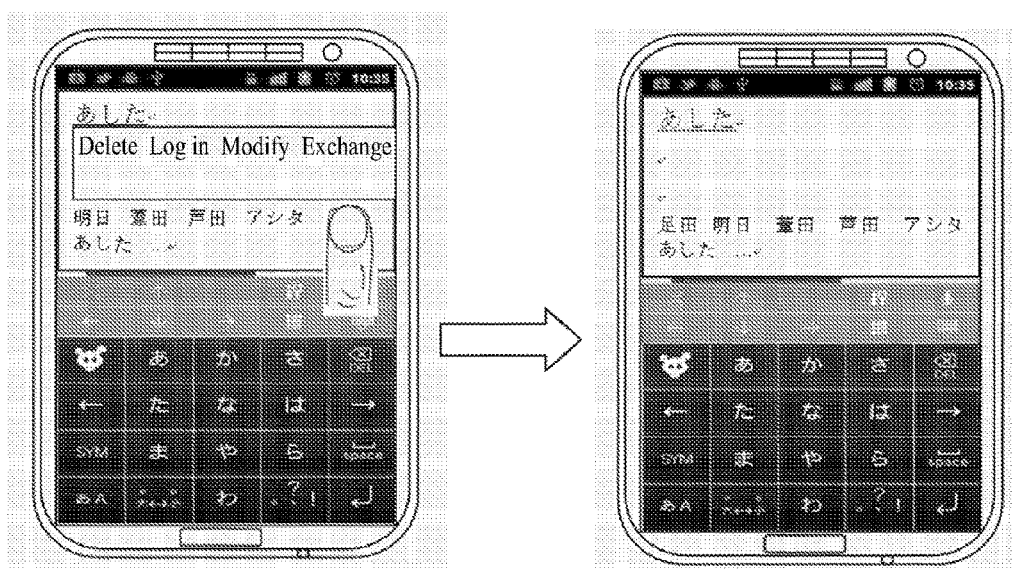
FIG. 8 shows an example of an operation of reordering candidates according to an embodiment of the present invention.

FIG. 8 shows an example of an operation of reordering candidates according to an embodiment of the present invention.

As shown in FIG. 8, when a user presses a displayed particular candidate (for example, "足田") for a predetermined time (for example, two seconds), a menu used for performing operations on candidates is displayed on the screen. As shown in FIG. 8, the menu may include the following items: delete, log in, modify, and move.

When the user further taps the item "move", all displayed candidates may be in an activated state. In the activated state, the candidates can be moved. In this way, any candidate in the activated state can be dragged to the position of another candidate. At the same time, the positions of other candidates may be adjusted in various manners (for example, the positions of the another candidate and the dragged candidate are exchanged; or the candidate at the position to which the dragged candidate is moved and other candidates following this position are sequentially moved to lower-ranking positions. As shown in FIG. 7, the candidate "足田" in the activated state is dragged to the position at which the candidate "叨山" is located, and the candidate "明月" and candidates following the candidate "明月" are moved to lower-ranking positions.

In another example, when a user presses a displayed particular displayed candidate (for example, "足田") for another predetermined time (for example, three seconds), all displayed candidates enter an activated state, allowing the user to adjust the order of the candidates. In this case, the menu used for performing operations on candidates is not displayed.

In addition, it is also feasible to perform an operation on a candidate in another manner. For example, a voice command or a text command may be entered to perform an operation on a candidate.

In step 304, the operation is recorded as a log entry in an operation log.

Figure 9:
FIG. 9 shows an example of an operation log according to an embodiment of the present invention.

FIG. 9 shows an example of an operation log according to an embodiment of the present invention.

FIG. 9 shows log entries that respectively correspond to the operations shown in FIG. 5 to FIG. 8. As shown in FIG. 9, each log entry may include at least an input item, a candidate item, and an operation type item.

The input item represents an input corresponding to an operated candidate. The candidate item represents an operated candidate. The operation type item represents a type of an operation performed on the operated candidate. For example, "delete" represents deletion, "new" represents addition, "modify" represents modification, and "exchange" represents reordering. It should be understood that the operation type may be represented in other manners.

For example, for some types of operations, a corresponding log entry further includes an operation content item. The operation content item represents specific operation content corresponding to an operation type.

For example, for the addition operation, the corresponding log entry further includes an insertion position of a newly added candidate that serves as the operation content item, or its place in ranking. For example, "5" in the second log entry shown in FIG. 9 represents that the newly added candidate is displayed in the fifth place.

For the modification operation, the corresponding log entry further includes content after the modification, where the content after the modification serves as the operation content item. For example, "朝田" in the third log entry shown in FIG. 9 represents content that the candidate "足田" is modified to.

For the reordering operation, the corresponding log entry further includes a place in ranking before the reordering and a place in ranking after the reordering that serve as the operation content item. For example, "5, 1" in the fourth log entry shown in FIG. 9 represents that the candidate "足田" is in the fifth place before the reordering and is in the first place after the reordering.

In addition, the user may also edit the operation log to modify a log entry or add a new log entry.

In step 305, the operation log is sent to the server.

In another embodiment, when candidates corresponding to the input of the user are displayed in step 302, it is further determined whether there is an operation log. When there is no operation log, candidates are determined according to a word stock of the input method system, and displayed. When there is an operation log, it is determined whether the operation log includes a log entry that indicates an operation on a candidate corresponding to the received input of the user. When there is no log entry that indicates an operation on a candidate corresponding to the received input of the user, candidates are determined according to the word stock of the input method system and displayed. When there is a log entry that indicates an operation on a candidate corresponding to the received input of the user, a candidate result determined according to the word stock of the input method system is corrected according to the operation indicated by the log entry, and then candidates are displayed.

The method shown in FIG. 4 may be combined with the method shown in FIG. 3. The method shown in FIG. 4 may be performed before or after the method shown in FIG. 3.

Figure 10:
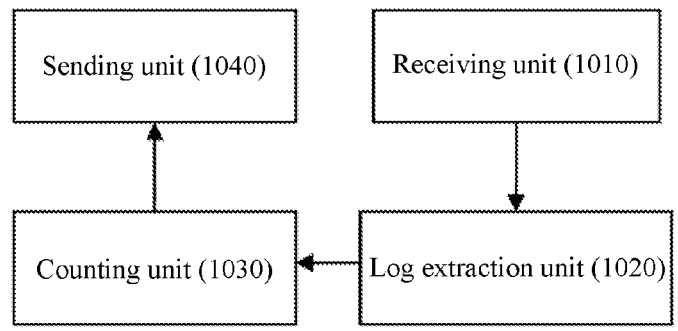
FIG. 10 is a block diagram of a device for updating an input method system on a server according to an embodiment of the present invention.

FIG. 10 is a block diagram of a device for updating an input method system on a server according to an embodiment of the present invention.

As shown in FIG. 10, a device 1000 for updating an input method system on a server according to this embodiment of the present invention includes: a receiving unit 1010, a log extraction unit 1020, a counting unit 1030, and a sending unit 1040.

The receiving unit 1010 is configured to receive multiple operation logs from multiple user terminals on which the input method system is installed. The operation log has been described above, and is not described in detail herein again.

The log extraction unit 1020 is configured to extract log entries from the received multiple operation logs.

The counting unit 1030 is configured to determine the quantity of log entries of each type.

Herein, log entries formed by same operations (that is, operations having a same operation type and same specific operation content) on a candidate corresponding to a same input belong to a same type. For example, log entries that indicate an operation of deleting a particular candidate corresponding to a particular input belong to a same type; log entries that indicate a same modification on a particular candidate corresponding to a particular input belong to a same type; log entries that indicate a same reordering operation on a particular candidate corresponding to a particular input belong to a same type; and log entries that indicate an operation of adding a same candidate for a particular input belong to a same type.

The sending unit 1040 is configured to send, according to the determined quantities, a log entry of a predetermined type to the user terminals on which the input method system is installed, so as to update the input method system.

Specifically, when the quantity of log entries of one type is greater than a predetermined threshold, or a ratio of the quantity of log entries of one type to the quantity of the user terminals on which the input method system is installed is greater than a predetermined threshold, the sending unit 1040 sends the log entry of this type to the user terminals on which the input method system is installed.

For example, if the quantity of log entries that indicate an operation of deleting a particular candidate corresponding to a particular input is greater than the predetermined threshold, the sending unit 1040 sends the log entry to the user terminals, so that the user terminals may perform, in a word stock of the input method system according to the log entry, the operation of deleting the particular candidate corresponding to the particular input, so as to update the input method system.

Figure 11:
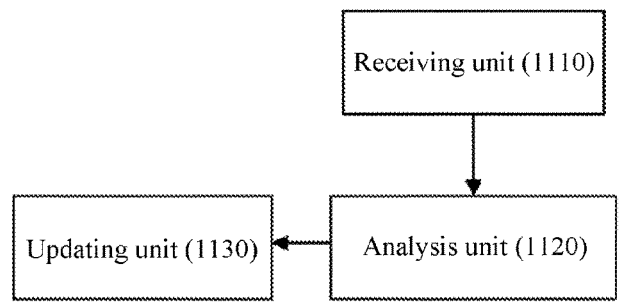
FIG. 11 is a block diagram of a device for updating an input method system on a user terminal according to an embodiment of the present invention.

FIG. 11 is a block diagram of a device for updating an input method system on a user terminal according to an embodiment of the present invention.

A device 1100 for updating an input method system on a user terminal according to this embodiment of the present invention includes: a receiving unit 1110, an analysis unit 1120, and an updating unit 1130.

The receiving unit 1110 is configured to receive update information from a server. The update information indicates an operation on a candidate corresponding to an input. For example, the update information herein may be the log entry of the predetermined type sent by the sending unit 1040 in FIG. 10.

The analysis unit 1120 is configured to analyze the received update information, to determine the operation indicated by the update information.

The updating unit 1130 is configured to perform, on a candidate that is in the input method system and that corresponds to an input, the operation indicated by the update information.

Figure 12:
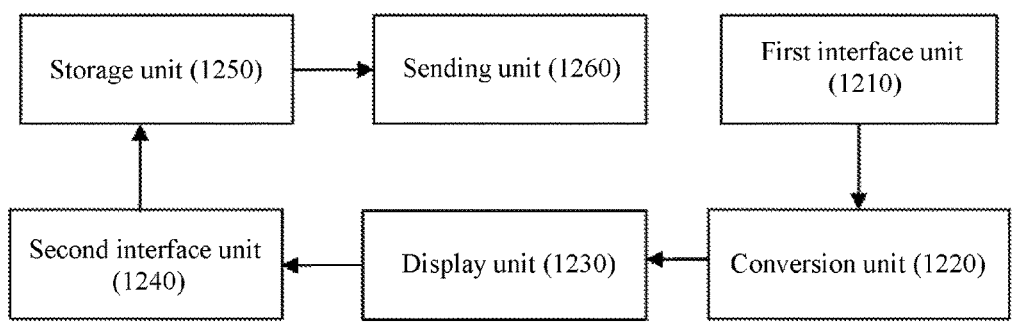
FIG. 12 is a block diagram of a device for updating an input method system on a user terminal according to another embodiment of the present invention.

FIG. 12 is a block diagram of a device for updating an input method system on a user terminal according to another embodiment of the present invention.

A device 1200 for updating an input method system on a user terminal according to another embodiment of the present invention includes: a first interface unit 1210, a display unit 1220, a conversion unit 1230, a second interface unit 1240, a storage unit 1250, and a sending unit 1260.

The first interface unit 1210 is configured to receive an input of a user. The input of the user refers to an input that is entered to the input method system for input conversion, for example, a group of phonetic alphabets that represent a Chinese pronunciation.

The conversion unit 1220 is configured to determine candidates corresponding to the input of the user. The candidates corresponding to the input of the user may be determined by using a conventional technology.

The display unit 1230 is configured to display the candidates corresponding to the input of the user.

The second interface unit 1240 is configured to receive an operation performed by the user on a candidate. The operation on the candidate may be of the following type: deletion, addition, modification, reordering, or the like.

The storage unit 1250 is configured to record the operation as a log entry in an operation log for storage.

The sending unit 1260 is configured to send the operation log to a server.

In another embodiment, when the first interface unit 1210 receives the input of the user, the conversion unit 1220 further determines whether there is an operation log in the storage unit 1240. When it is determined that there is no operation log in the storage unit 1240, the conversion unit 1220 determines candidates according to a word stock of the input method system. When it is determined that there is an operation log in the storage unit 1240, the conversion unit 1220 determines whether the operation log includes a log entry that indicates an operation on a candidate corresponding to the received input of the user. When there is no log entry that indicates an operation on a candidate corresponding to the received input of the user, the conversion unit 1220 determines candidates according to the word stock of the input method system. When there is a log entry that indicates an operation on a candidate corresponding to the received input of the user, the conversion unit 1220 corrects, according to the operation indicated by the log entry, a candidate result determined according to the word stock of the input method system, and then the display unit 1230 displays a result after the correction.

The devices shown in FIG. 11 and FIG. 12 may be integrated as an independent device for updating an input method system on a user terminal.

The method and device for updating an input method system according to the embodiments of the present invention can accurately detect an actual requirement of a user on the input method system, and update the input method system. In this way, the updated input method system can better reflect the actual requirement of the user on the input method system.

In addition, the method and device for updating an input method system according to the embodiments of the present invention allow a user to adjust candidates displayed in the input method system, thereby updating the input method system, so that the input method system can be updated according to a personalized requirement.

Although the present invention has been specifically disclosed and described with reference to the exemplary embodiments, a person skilled in the art should understand that, various modifications can be made to the form and details of the present invention without departing from the spirit and scope of the present invention that are defined in the claims.

What is claimed is:

1. A method of updating an input method system on a server, comprising:

receiving, at the server, a plurality of operation logs from a plurality of user terminals on which the input method system is installed, wherein the plurality of operation logs record a plurality of log entries corresponding to a plurality of user inputs entered to the input method system on each of the plurality of user terminals, wherein each log entry includes a candidate item displayed in response to a user input of the plurality of user inputs entered, the user input corresponding to the candidate item, and an operation type, the operation type comprises at least one of deletion, addition, or replacing on the candidate item;

extracting the log entries from the received plurality of operation logs;

determining a quantity of log entries of each operation type; and when the determined quantity of log entries of one operation type is greater than a first predetermined threshold, or a ratio of the determined quantity of log entries of the one operation type to a quantity of the plurality of user terminals on which the input method system is installed is greater than a second predetermined threshold, sending a common log entry of the one operation type from the server to each of the plurality of user terminals on which the input method system is installed, so as to update the input method system on each of the plurality of user terminals.

2. The method according to claim 1, wherein each log entry indicates one operation on a candidate item corresponding to one user input.

3. The method according to claim 1, wherein the plurality of user terminals perform, on a candidate item that is in the input method system and that corresponds to an user input, an operation indicated by the common log entry of the one operation type, so as to update the input method system.

4. A method of updating an input method system on a first client, comprising:
receiving, at the first client, common update information for a plurality of clients from a server separate from the plurality of clients, wherein the common update information includes a candidate item displayed in response to a user input entered to the input method system, the user input corresponding to the candidate item, and an operation type, the operation type comprises at least one of deletion, addition, or replacing on the candidate item;
analyzing the received common update information, to determine the operation indicated by the common update information, to update the input method system on the first client; and
performing, on the candidate item that is in the input method system and that corresponds to the user input, the operation indicated by the common update information;
wherein the common update information is a log entry of a predetermined operation type among a plurality of log entries in a plurality of operation logs that are received by the server from a plurality of user terminals on which the input method system is installed, the plurality of log entries corresponding to a plurality of user inputs entered to the input method system on each of the plurality of user terminals, wherein the common update information is determined when an quantity of the log entries of the predetermined operation type is greater than a first predetermined threshold, or a ratio of the quantity of the log entries of the predetermined operation type to a quantity of the user terminals on which the input method system is installed is greater than a second predetermined threshold.

5. The method according to claim 4, wherein each piece of the common update information indicates one operation on a candidate item corresponding to one user input.

6. The method according to claim 4, further comprising:
receiving an input of a user;
determining a plurality of candidate items corresponding to the input of the user;
displaying the plurality of candidate items corresponding to the input of the user;
receiving an operation performed by the user on one of the plurality of candidate items;
recording the operation as a log entry in an operation log; and
sending the operation log to the server.

7. A non-transitory machine-readable medium having instructions stored therein, which when executed by a processor, cause the processor to perform operations of updating an input method system on a server, the operations comprising:
receiving, at the server, a plurality of operation logs from a plurality of user terminals on which the input method system is installed, wherein the plurality of operation logs record a plurality of log entries corresponding to a plurality of user inputs entered to the input method system on each of the plurality of user terminals, wherein each log entry includes a candidate item displayed in response to a user input of the plurality of user inputs entered, the user input corresponding to the candidate item, and an operation type, the operation type comprises at least one of deletion, addition, or replacing on the candidate item;
extracting the log entries from the received plurality of operation logs;
determining a quantity of log entries of each operation type; and
when the determined quantity of log entries of one operation type is greater than a first predetermined threshold, or a ratio of the determined quantity of log entries of the one operation type to a quantity of the plurality of user terminals on which the input method system is installed is greater than a second predetermined threshold, sending a common log entry of the one operation type from the server to each of the plurality of user terminals on which the input method system is installed, so as to update the input method system on each of the plurality of user terminal.

8. The non-transitory machine-readable medium according to claim 7, wherein each log entry indicates one operation on a candidate item corresponding to one user input.

9. The non-transitory machine-readable medium according to claim 7, wherein the user terminals perform, on a candidate item that is in the input method system and that corresponds to an user input, an operation indicated by the common log entry of the one operation type, so as to update the input method system.

10. A device, comprising:
a processor; and
a memory coupled to the processor storing instructions, which when executed by the processor, cause the processor to perform operations, the operations including:
receiving, at the device, a plurality of operation logs from a plurality of user terminals on which the input method system is installed, wherein the plurality of operation logs record a plurality of log entries corresponding to a plurality of user inputs entered to the input method system on each of the plurality of user terminals, wherein each log entry includes a candidate item displayed in response to a user input of the plurality of user inputs entered, the user input corresponding to the candidate item, and an operation type, the operation type comprises at least one of deletion, addition, or replacing on the candidate item;
extracting the log entries from the plurality of operation logs;
determining a quantity of log entries of each operation type; and
when the determined quantity of log entries of one operation type is greater than a first predetermined threshold, or a ratio of the determined quantity of log entries of the one operation type to a quantity of the plurality of user terminals on which the input method system is installed is greater than a second predetermined threshold, sending a common log entry of the one operation type from the server to each of the plurality of user terminals on which the input method system is installed, so as to update the input method system on each of the plurality of user terminals.

11. A non-transitory machine-readable medium having instructions stored therein, which when executed by a processor, cause the processor to perform operations of updating an input method system on a first client, the operations comprising:

receiving, at the first client, common update information for a plurality of clients from a server separate from the plurality of clients, wherein the common update information includes a candidate item displayed in response to a user input entered to the input method system, the user input corresponding to the candidate item, and an operation type, the operation type comprises at least one of deletion, addition, or replacing on the candidate item;

analyzing the received common update information, to determine the operation indicated by the common update information, to update the input method system on the first client; and performing, on the candidate item that is in the input method system and that corresponds to the user input, the operation indicated by the common update information;

wherein the common update information is a log entry of a predetermined operation type among a plurality of log entries in a plurality of operation logs that are received by the server from a plurality of user terminals on which the input method system is installed, the plurality of log entries corresponding to a plurality of user inputs entered to the input method system on each of the plurality of user terminals, wherein the common update information is determined when a quantity of the log entries of the predetermined operation type is greater than a first predetermined threshold, or a ratio of the quantity of the log entries of the predetermined operation type to a quantity of the user terminals on which the input method system is installed is greater than a second predetermined threshold.

12. The non-transitory machine-readable medium according to claim 11, wherein each piece of the common update information indicates one operation on a candidate item corresponding to one user input.

13. The non-transitory machine-readable medium according to claim 11, wherein the operations further comprise:
receiving an input of a user;
determining a plurality of candidate items corresponding to the input of the user;
displaying the plurality of candidate items corresponding to the input of the user;
receiving an operation performed by the user on one of the plurality of candidate items;
recording the operation as a log entry in an operation log; and
sending the operation log to the server.

* * * * *